(12) United States Patent
Martinez de Velasco Cortina

(10) Patent No.: US 7,091,862 B2
(45) Date of Patent: Aug. 15, 2006

(54) SYSTEM AND METHOD FOR PROVIDING SECURE IDENTIFICATION SOLUTIONS UTILIZING A RADIO FREQUENCY DEVICE IN A NON-METALLIZED REGION CONNECTED TO A METALLIZED REGION

(75) Inventor: Francisco Martinez de Velasco Cortina, Mexico (MX)

(73) Assignee: Neology, Inc., San Diego, CA (US)

( * ) Notice: Subject to any disclaimer, the term of this patent is extended or adjusted under 35 U.S.C. 154(b) by 61 days.

(21) Appl. No.: 10/718,814

(22) Filed: Nov. 24, 2003

(65) Prior Publication Data

US 2004/0164865 A1    Aug. 26, 2004

Related U.S. Application Data

(60) Provisional application No. 60/428,257, filed on Nov. 22, 2002.

(51) Int. Cl.
*G08B 13/14*    (2006.01)

(52) U.S. Cl. ............... 340/572.1; 340/572.7; 340/5.86; 340/933; 359/2; 205/125; 29/600; 216/102

(58) Field of Classification Search ............. 340/572.1, 340/539.1, 933
See application file for complete search history.

(56) References Cited

U.S. PATENT DOCUMENTS

| | | | |
|---|---|---|---|
| 4,682,852 A | 7/1987 | Weber | |
| 4,727,360 A | 2/1988 | Ferguson et al. | |
| 4,728,962 A | 3/1988 | Kitsuda et al. | |
| 5,477,219 A | 12/1995 | Zarembo et al. | |
| 5,528,222 A | 6/1996 | Moskowitz et al. | |
| 5,557,279 A | 9/1996 | D'Hont | |
| 5,608,417 A | 3/1997 | De Vall | |
| 5,621,571 A | 4/1997 | Bantli et al. | |
| 6,018,298 A | 1/2000 | Endo et al. | |
| 6,031,458 A | 2/2000 | Jacobsen et al. | |
| 6,894,615 B1 * | 5/2005 | Look ................ | 340/572.1 |

FOREIGN PATENT DOCUMENTS

WO    WO 02/089338 A    11/2002

* cited by examiner

*Primary Examiner*—Julie Bichgoc Lieu
(74) *Attorney, Agent, or Firm*—Baker & McKenzie LLP

(57) ABSTRACT

The present invention provides systems and methods for transmitting and receiving information from a radio frequency (RF) transponder. A conductive adhesive connects an antenna in a non-metallized region to a metallized region. This feature transforms the entire metallized region of the radio frequency device (i.e., the remainder of the metallized material outside the non-metallized region) into an antenna.

16 Claims, 4 Drawing Sheets

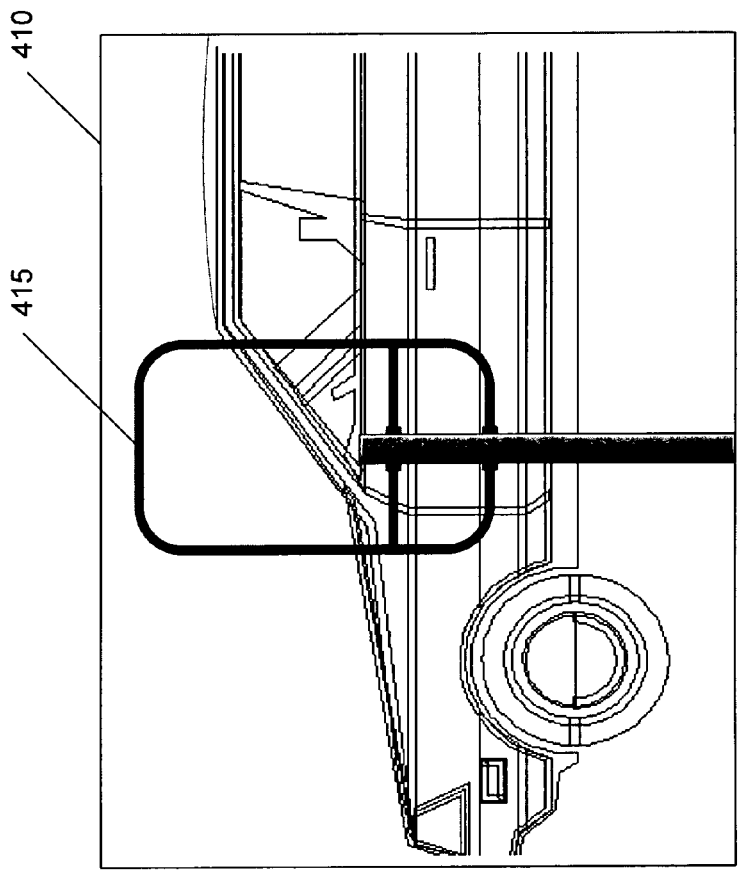
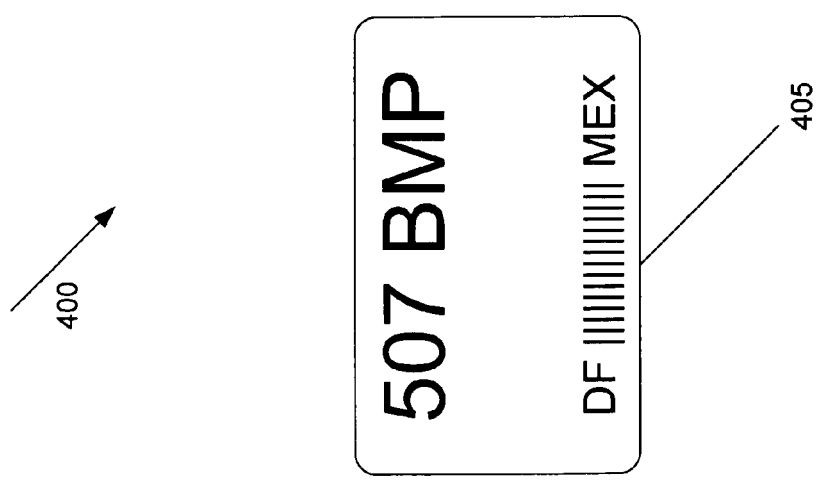
FIG. 4

SYSTEM AND METHOD FOR PROVIDING SECURE IDENTIFICATION SOLUTIONS UTILIZING A RADIO FREQUENCY DEVICE IN A NON-METALLIZED REGION CONNECTED TO A METALLIZED REGION

This application claims priority to U.S. Provisional Patent Application Ser. No. 60/428,257 filed Nov. 22, 2002. The entirety of that provisional application is incorporated herein by reference.

The application incorporates by reference: U.S. patent application Ser. No. 10/636,732, filed Aug. 8, 2003; U.S. patent application Ser. No. 10/615,026, filed Jul. 9, 2003; U.S. patent application Ser. No. 10/118,092, filed Apr. 9, 2002 now U.S. Pat. No. 7,034,688; PCT Patent Application PCT/IB02/01439, filed Apr. 30, 2002; German Patent Application No. 10121126.0, filed Apr. 30, 2001; Mexican Patent Applications No. 010967, filed Oct. 26, 2001, No. 010968, filed Oct. 26, 2001, No. 010969, filed Oct. 26, 2001, No. 010971, filed Oct. 26, 2001, No. 003141, filed Mar. 25, 2002, and No. 003202, filed Mar. 26, 2002.

FIELD OF THE INVENTION

The present invention relates generally to a system and method for providing secure identification solutions, and specifically to a system and method for providing secure identification solutions utilizing devices with radio frequency (RF) transponders.

BRIEF DESCRIPTION OF THE FIGURES

FIG. 4 illustrates a method of use 400 of use of the RF device described above, according to one embodiment of the present invention.

DESCRIPTION OF THE INVENTION

Figure 1:
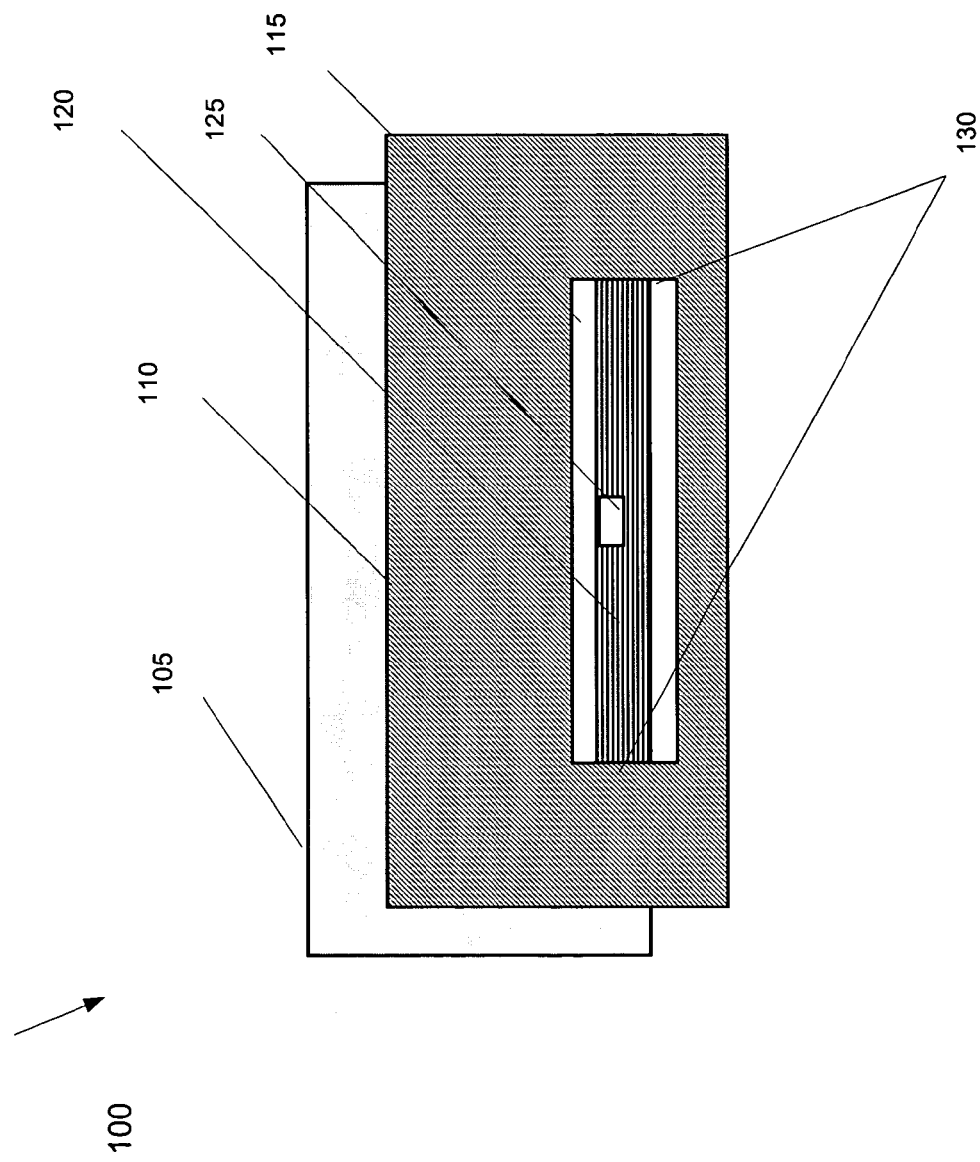
FIGS. 1 and 2 illustrate RF devices 100 and 200, according to two embodiments of the present invention.

The present invention provides systems and methods for transmitting and receiving information from a radio frequency (RF) device (e.g., an RF transponder). A conductive adhesive connects an antenna in a non-metallized region to a metallized region. This feature transforms the entire metallized region of the RF device (i.e., the remainder of the metallized material outside the non-metallized region) into an antenna. This enables greater reading distance and greater data capacity.

In one embodiment, the non-metallized region is a formerly metallized region that has been demetallized. A metal foil substrate which remains following the demetallization process is converted into an antennal surface. This antennal surface captures power as a parabolic or increased area, rather than allowing the metal foil substrate to interfere.

Connection of the antenna to the metallized region can take place in a variety of areas. The following description sets forth two possible attachment configurations (e.g., connections on the sides, connections on the top and bottom), but those experienced in the art will see that multiple other attachment configurations are possible.

The present invention utilizes the following features: passive transponder systems; and retro-reflective, holographic, and other metallic materials.

Passive Transponder Systems. Passive transponder systems are used worldwide for many identification purposes. A passive transponder system is powered by an electromagnetic field of a reader. (No power supply is within the transponder.) A transponder is a transceiver (e.g., a transmitter/receiver that both transmits and receives signals) in a communication satellite that receives a signal from an earth station and retransmits it on a different frequency to one or more other earth stations. An internal antenna of the transponder is used for both data transmission and energy transmission between the reader and the transponder, using, for example, the same frequency for the data and energy transmissions.

Retro-Reflective, Holographic, and Other Metallic Materials. Retro-reflective materials can reflect and re-emit incident light in a direction that is parallel to that of the source of the incident light. In other words, retro-reflective materials reflect light directly back toward the source of the light. Such materials and devices are widely used in the areas of nighttime transportation and safety. For example, retro-reflective materials are used to illuminate highway lanes and road signs using the light emitted from vehicle headlights. Retro-reflective materials are also used for the production of plates and decals for vehicles and for truck containers, tractors and other applications. Retro-reflective materials have a bright effect under direct light without disturbing human sight.

Holographic materials have also been used for identification purposes. Since holograms are difficult to counterfeit, they are increasingly used for identification purposes (e.g., driver's licenses, credit cards, bus passes, etc.) to increase security.

Both retro-reflective and holographic materials typically contain a very high level of metal such as aluminum. Holograms, for example, are typically stamped from metal foils. It is known that metal blocks the transmission and reception of RF signals because the RF signal is absorbed or distorted by the metal content in the material. As a result, the signal cannot be received by an antenna blocked by metal. Such a blocked signal cannot be used, for example, to activate a connected device. This same blocking effect can occur whether the device is positioned on top of or underneath the metallic material because the distortion and absorption of the RF signal will be affected in either case.

The RF Device

In one embodiment of the invention, as described further, for example, in U.S. Provisional Patent Application Ser. No. 60/394,241, filed Jul. 9, 2002, and the corresponding utility U.S. patent application Ser. No. 10/615,026, filed Jul. 9, 2003, a system for delivering security solutions is provided that includes one or more of the following: a radio frequency (RF) device; and an identification mechanism (e.g., a card, sticker, device). According to another embodiment of the present invention, as described further in these applications, the RF device includes retro-reflective, holographic, or other material containing metal, and an antenna for receiving radio frequency (RF) signals.

As explained above, in one embodiment of the present invention, an entire metallized region of an RF device is transformed into an antenna by connecting an antenna in a non-metallized region to a metallized region, allowing for greater reading distance and greater data accuracy. Connecting the antenna in the non-metallized region to the metallized region also aids in overcoming transmission problems created by metallic materials.

FIG. 1 illustrates an RF device 100, according to one embodiment of the present invention. The RF device 100 comprises: a metallized region 110 (e.g., a retro-reflective, holographic, or other metal material), a non-metallized region 115 (e.g., a demetallized region), an antenna 120, a chip 125, and a connection 130 (e.g., a conductive adhesive). An optional holographic image is included in the non-metallized region. An optional liner 105 is used as a base layer to carry the adhesive into the label.

The metallized region 110 comprises, for example, the following materials: Retro-Reflective, Holographic, and metallized covers. The non-metallized region 115 comprises, for example, the following materials: PET, PVC, Polypropylene, vinyl. The antenna 120 comprises, for example, the following materials: conductive inks, aluminum, etc. The chip 125 (e.g., Picorypt made by Inside Technologies, Sahara made by BNC US Holding, San Diego, Calif., or any RF chip) comprises control logic for controlling the RF signal and for Analog to Digital or Digital to Analog conversion. The connection 130 comprises, for example, the following materials: gold and/or silver bumps. The holographic image comprises, for example, the following materials: Aluminum. The base layer comprises, for example, the following materials: PET, PVC, Polypropylene, vinyl. The connection 130 connects the sides of the antenna 120 in the non-metallized region 115 to the metallized region 110. The antenna 120 is thus in electrical communication (i.e., electronically coupled) with the chip 125. In one embodiment of the present invention, the non-metallized region 115 has been selectively demetallized such that the chip 125 can transmit and receive information.

Figure 2:
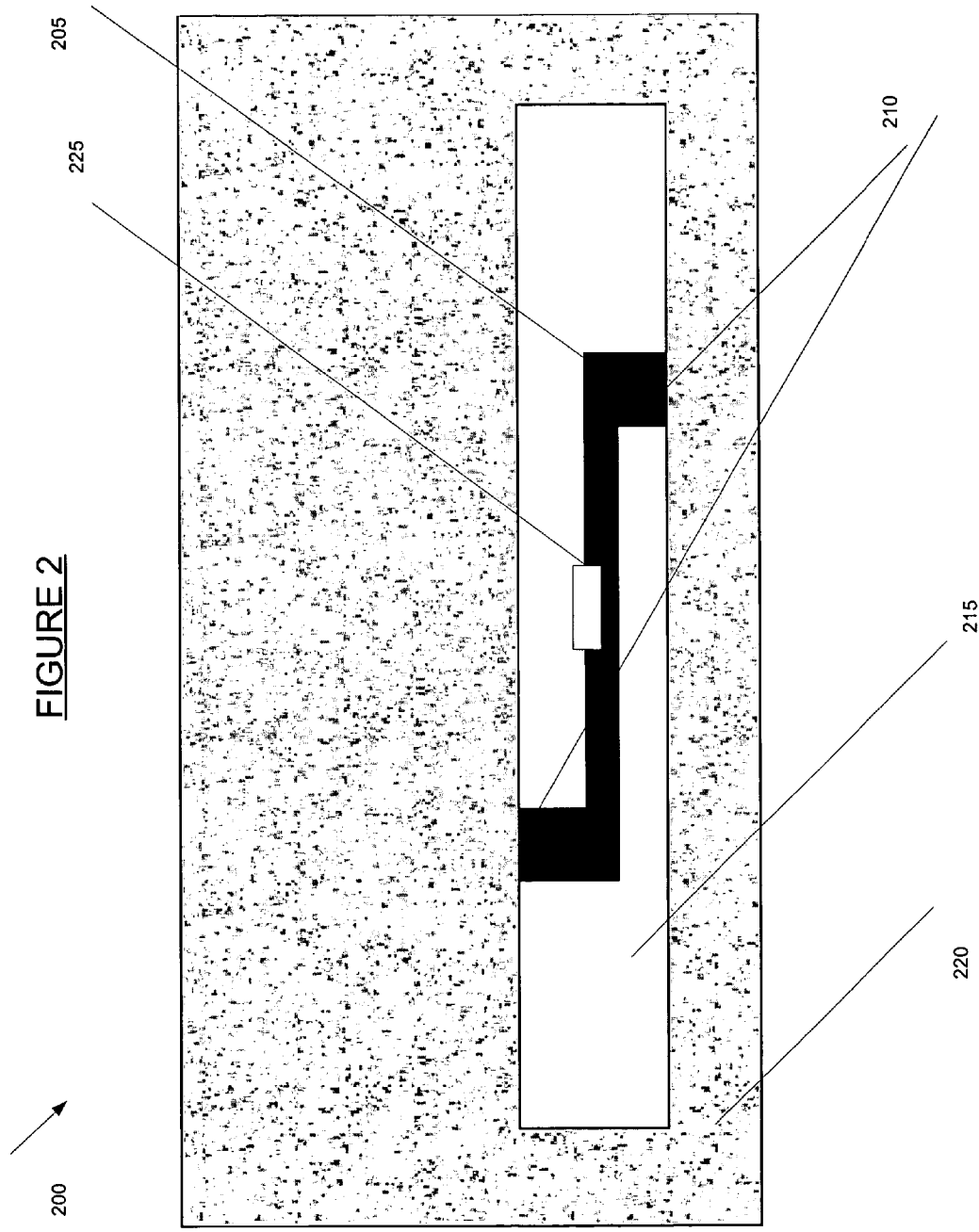

FIG. 2 illustrates an RF device 200, according to one embodiment of the present invention. The RF device 200 comprises: a metallized region 220 (e.g., a retro-reflective, holographic, or other metallic material), a non-metallized region 215, an antenna 205, a chip 225, and a connection 210 (e.g., a conductive adhesive). The components of device 200, in one embodiment, are made of material similar to that described above with reference to FIG. 1. The connection 210 connects a portion of the top and bottom of the antenna 205 in the non-metallized region 215 to the metallized region 210. The antenna 220 is in electrical communication with the chip 225.

Method of Making the RF Device

Figure 3:
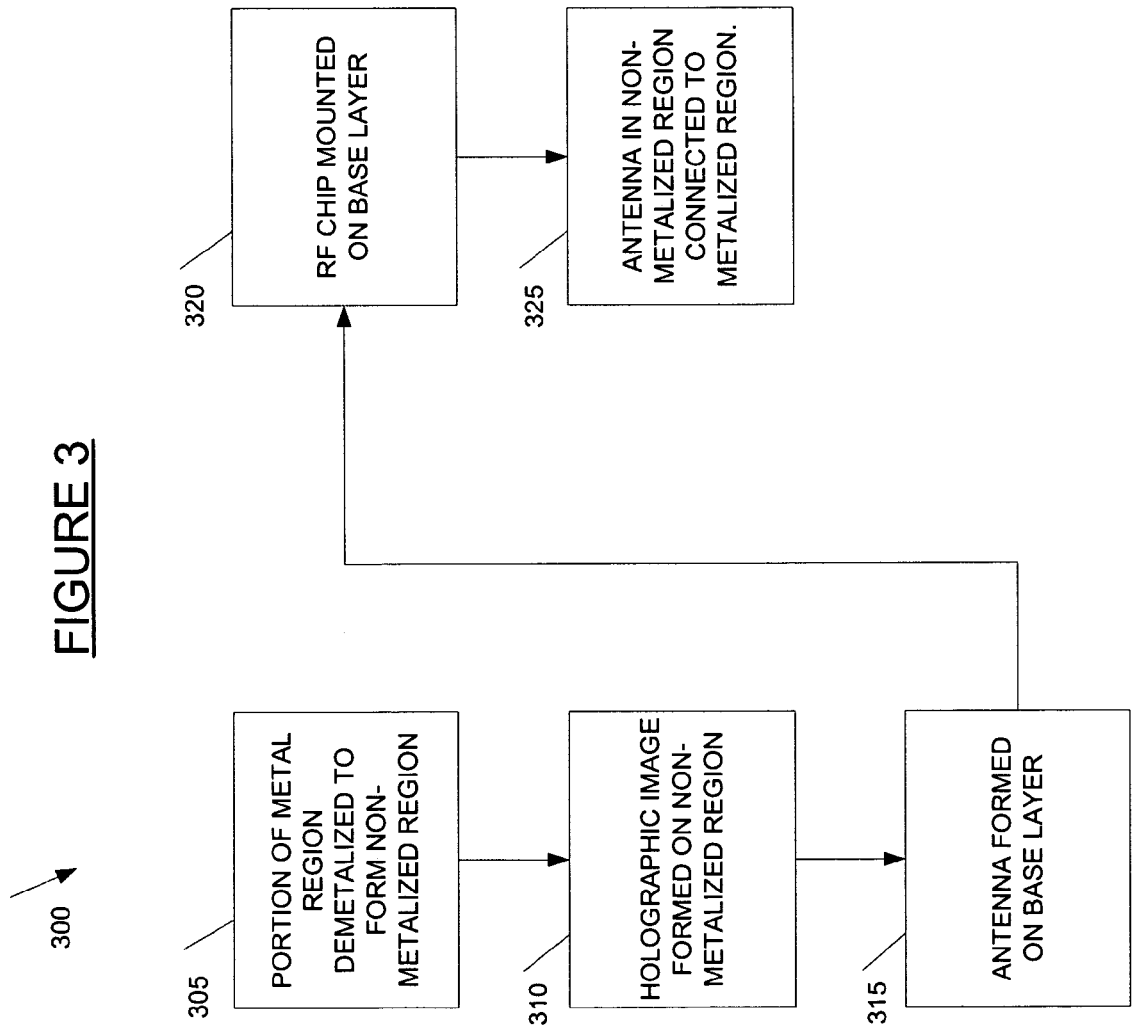
FIG. 3 illustrates a method of making 300, according to one embodiment of the present invention.

FIG. 3 illustrates an overview of a method of making 300, according to one embodiment of the present invention. A method of making an RF device comprising a base layer and at least one metal region disposed thereon is illustrated. In step 305, a first metal region of the device is selectively demetallized to create a non-metallized region. The process of demetalization comprises covering the parts that are not wanted for demetalization with a protective layer of indelible inks, afterwards, the material is placed in a solution of ferric chloride and hydrochloric acid, which will remove the whole metallic material that has not been protected. Then, the material is washed to eliminate the residual acid and the protective inks. The conductivity of the material is measured for quality control, and to assure that the metallized material will be suitable for use as an antenna for the Radio Frequency device. In step 310, a holographic image is formed on the non-metallized region. To make a holographic image, a beam of laser light is optically separated into two beams. One, the reference beam, is directed toward a piece of holographic film and expanded (its diameter increased) so that the light covers the film evenly and completely. The second (object) beam is directed at the subject of the composition and similarly expanded to illuminate it.

When the object beam reflects off the subject, it carries with it information about the location, size, shape and texture of the subject. Some of this reflected object beam then meets the reference beam at the holographic film, producing an interference pattern which is recorded in the light sensitive emulsion.

Embossed holograms are holograms with a mirror backing. Embossing is the most frequently used method of mass-production in holography. The holographic information is transferred from light sensitive glass plates to nickel embossing shims. The holographic images are "printed" by stamping the interference pattern onto plastic and then backing the images with a light reflecting foil. The resulting hologram can be duplicated millions of times. In step 315, an antenna is formed on the base layer. In step 320, an RF chip is mounted on the base layer in electrical communication with the antenna to form an RF transponder. In step 325, the antenna in the non-metallized region is connected to the metallized region with a connector (e.g., a conductive adhesive).

Example use of the RF Device

FIG. 4 illustrates a method of use 400 of RF device 100 and/or 200, according to one embodiment of the present invention. In this case, the RF device is a window sticker 405 displayed on a vehicle 410. As the vehicle passes an RF reader 415 (e.g., a U519 reader manufactured by BNC US holding, San Diego, Calif.) the information from the RF device is read. In one embodiment, an RF reader/writer is used, and information is read and written to and from the RF device. As will be apparent to those skilled in the relevant art(s) after reading the description herein, the window sticker is merely one illustration of the multiple uses of an RF device, and that the present invention is not limited to this embodiment. Other example uses of the RF device are: a passport, a driver's license, a license plate or other vehicle identification mechanism, a sticker, and a cell phone.

CONCLUSION

The present invention is described in terms of the above embodiments. This is for convenience only and is not intended to limit the application of the present invention. In fact, after reading the description of the present invention or upon learning by practice of the invention, additional advantages, features, and embodiments of the invention will be apparent to one skilled in the relevant arts.

In addition, it should be understood that the Figures described above, which highlight the functionality and advantages of the present invention, are presented for example purposes only. The architecture of the present invention is sufficiently flexible and configurable, such that it may be utilized in ways other than that shown in the Figures.

What is claimed is:

1. A radio frequency device comprising:

at least one metallized region;

at least one non-metallized region;

at least one antenna on the at least one non-metallized region;

at least one radio frequency chip in communication with the at least one antenna; and at least one electrical connection connecting the at least one antenna to the at least one metallized region such that the at least one metallized region acts as a second antenna.

2. The radio frequency device of claim 1, further comprising:
   at least one base layer.

3. The radio frequency device of claim 2, wherein the at least one metallized region is disposed on the at least one base layer.

4. The radio frequency device of claim 1, wherein the at least one non-metallized region is created by demetallizing a portion of the at least one metallized region.

5. The radio frequency device of claim 1, further comprising at least one holographic image.

6. The radio frequency device of claim 5, wherein the at least one holographic image is in the at least one non-metallized region.

7. A radio frequency device comprising:
   at least one base layer;
   at least one metallized region disposed on the at least one base layer;
   at least one non-metallized region;
   at least one antenna on the at least one non-metallized region;
   at least one radio frequency chip on the at least one base layer in communication with the at least one antenna; and
   at least one electrical connection connecting the at least one antenna to the at least one metallized region such that the at least one metallized region acts as a second antenna.

8. The radio frequency device of claim 7, further comprising at least one holographic image.

9. The radio frequency device of claim 7, wherein the at least one holographic image is in the at least one non-metallized region.

10. The radio frequency device of claim 7, wherein the at least one non-metallized region is created by demetallizing a portion of the at least one metallized region.

11. A radio frequency device comprising:
    at least one base layer;
    at least one metallized region disposed on the at least one base layer;
    at least one non-metallized region;
    at least one holographic image;
    at least one antenna on the at least one non-metallized region;
    at least one radio frequency chip in the at least one base layer in communication with the at least one antenna; and
    at least one electrical connection connecting the at least one antenna to the at least one metallized region such that the at least one metallized region acts as a second antenna.

12. The radio frequency device of claim 11, wherein the at least one holographic image is in the at least one non-metallized region.

13. The radio frequency device of claim 11, wherein the at least one non-metallized region is created by demetallizing a portion of the at least one metallized region.

14. A radio frequency device comprising:
    at least one base layer;
    at least one metallized region disposed on the at least one base layer;
    at least one non-metallized region;
    at least one holographic image on the at least one non-metallized region;
    at least one antenna on the at least one non-metallized region;
    at least one radio frequency chip in the at least one base layer in communication with the at least one antenna; and
    at least one electrical connection connecting the at least one antenna to the at least one metallized region such that the at least one metallized region acts as a second antenna.

15. The radio frequency device of claim 14, wherein the at least one non-metallized region is created by demetallizing a portion of the at least one metallized region.

16. A radio frequency device comprising:
    at least one base layer;
    at least one metallized region disposed on the at least one base layer;
    at least one non-metallized region;
    at least one holographic image in the at least one non-metallized region;
    at least one antenna on the at least one non-metallized region;
    at least one radio frequency chip on the at least one base layer in communication with the at least one antenna; and
    at least one electrical connection connecting the at least one antenna to the at least one metallized region such that the at least one metallized region acts as a second antenna; and
    whereby the at least one non-metallized region is created by demetallizing a portion of the at least one metallized region.

* * * * *